Figure 1:
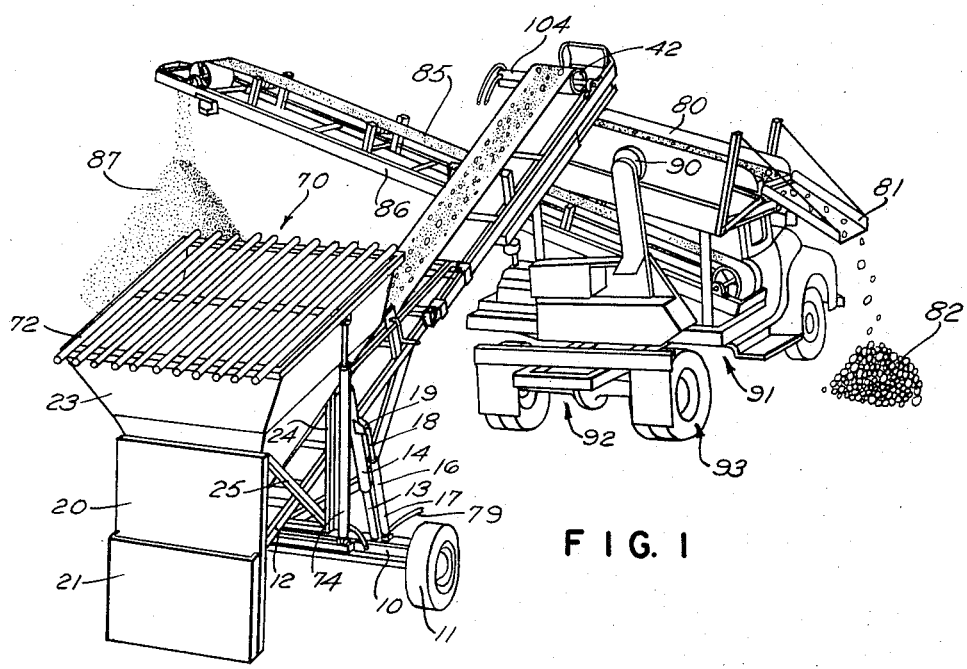

Jan. 23, 1968  J. M. TAYLOR  3,365,050

PORTABLE GRAVEL HANDLING APPARATUS

Filed July 22, 1965  2 Sheets-Sheet 1

INVENTOR.
JOSEPH M. TAYLOR
BY
Barlow & Barlow
ATTORNEYS

Jan. 23, 1968 J. M. TAYLOR 3,365,050

PORTABLE GRAVEL HANDLING APPARATUS

Filed July 22, 1965 2 Sheets-Sheet 2

INVENTOR.
JOSEPH M. TAYLOR
BY
*Barlow & Barlow*
ATTORNEYS

United States Patent Office 3,365,050
Patented Jan. 23, 1968

3,365,050
PORTABLE GRAVEL HANDLING APPARATUS

Joseph M. Taylor, Cape Elizabeth, Maine, assignor to Machinery Incorporated, Maine, a corporation of Maine Filed July 22, 1965, Ser. No. 473,936
3 Claims. (Cl. 198—120.5)

This invention relates to a portable gravel handling apparatus such as may be used in the construction of roads or the like.

The invention comprises a receiving means in the form of a hopper into which raw material consisting of stones, sand and the like of many different grades may be dumped, the top of the hopper having a grizzly thereover which prevents very large pieces of material entering the hopper and with a means for clearing the top of the grizzly as occasion should require. The hopper acts on a funnel to direct the gravel of various grades onto a conveyor, the conveyor and hopper being mounted upon an axle having wheels so that the same may be portable. The conveyor is extendable so that it may be shortened for easier transportation and extended when in use.

Means are also provided so that the belt of the conveyor, which is an expensive item, will not be damaged should a large piece of material in the hopper tend to jam in getting out of the hopper between the hopper and the conveyor. Also the conveyor is provided with a ballast leg which may engage the ground when it is sufficiently inclined, and the conveyor may be raised from the axle about such leg as a fulcrum. The conveyor discharges onto a screen which segregates the coarser material from the finer material, the screen being inclined to discharge in two discrete vertical axes and in some cases including a conveyor below the screen to pick up the finer material and discharges it at a distance removed from the screen. This screen and the finer material conveyor are located a sufficient height so that the discharges therefrom may be into trucks and the entire screen and its conveyors may be mounted upon a truck or tractor to bodily swing into line with the longitudinal extent of the truck or tractor for towing.

An object of the invention is to provide an apparatus having a low center of gravity for ease in towing and yet a high discharge point for material therefrom so that it may be discharged directly into a truck.

Another object of the invention is to provide an apparatus which may be controlled by fluid motors which may be readily carried upon the frame of the apparatus.

Another object of the invention is to provide an extendable conveyor which may be shortened for easier towing and compliance with highway trailer length limits.

Another object of the invention is to provide an extendable conveyor with a means for rolling up the belt so that it will not be damaged when the conveyor is shortened.

Another object of the invention is to provide a hopper and a conveyor assembly in which the wall of the hopper on the advance side of the conveyor will be yielding so that if a large piece of material engages the wall of the hopper and tends to get jammed into the space between this wall of the hopper and the conveyor, the conveyor will not be damaged but rather the wall of the hopper will give to permit the large piece of material to be moved from the hopper.

Another object of the invention is to provide a conveyor having a leg for engaging the ground so that the conveyor may pivot about the lower end of the leg as a fulcrum to raise the conveyor with respect to the axle upon which it is supported.

Another object of the invention is to provide a discharge into a screen which will act as a discharge of coarse material in one direction while a conveyor beneath the screen acts as a discharge of finer material in the opposite direction, and both of which discharges are of heights sufficient to load directly into trucks.

With these and other objects in view, the invention consists of certain novel features of construction as will be more fully described and particularly pointed out in the appended claims.

Figure 2:
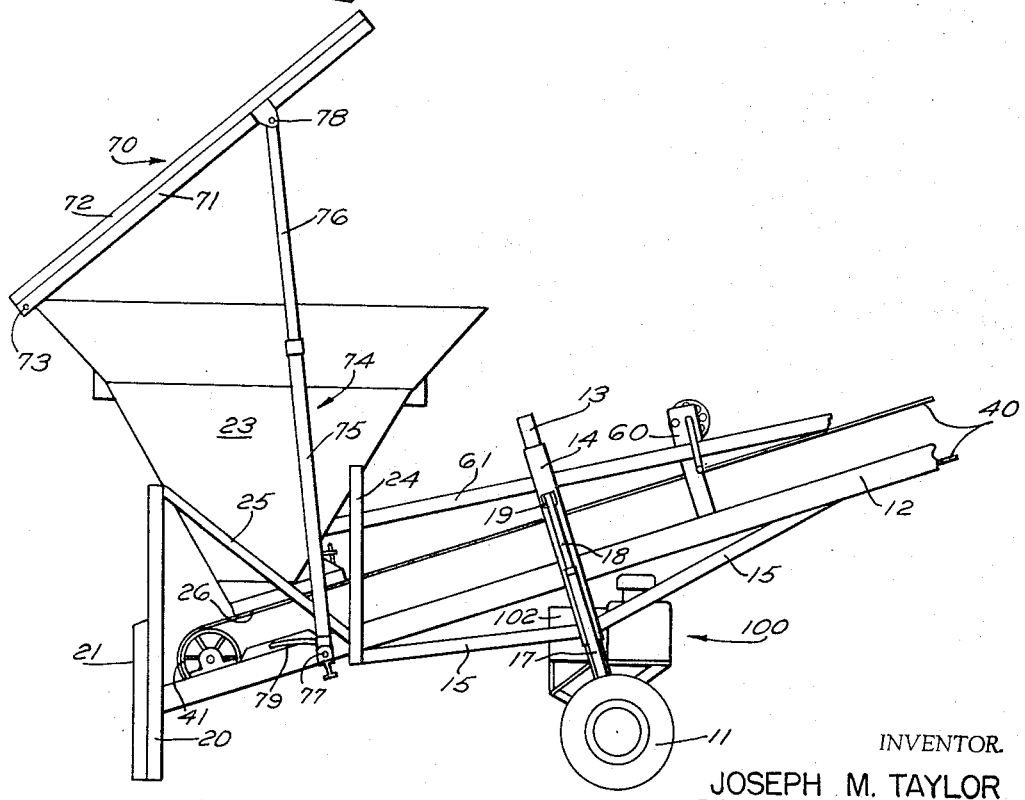
Figure 3:
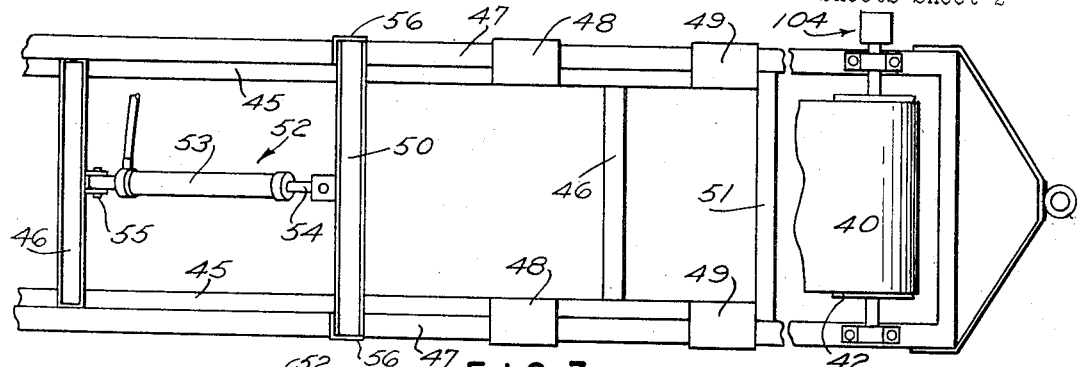
Figure 4:
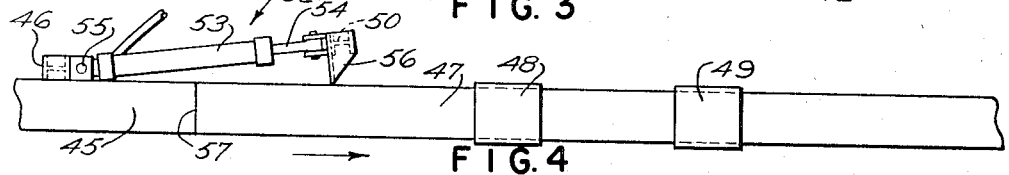
Figure 5:
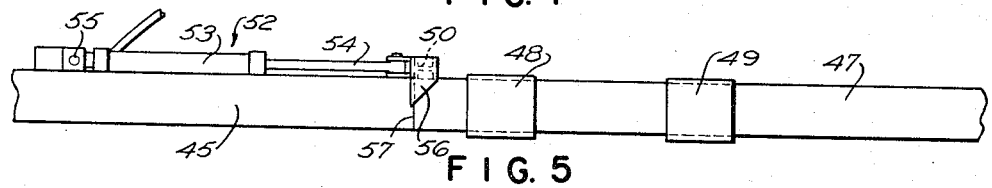
Figure 6:
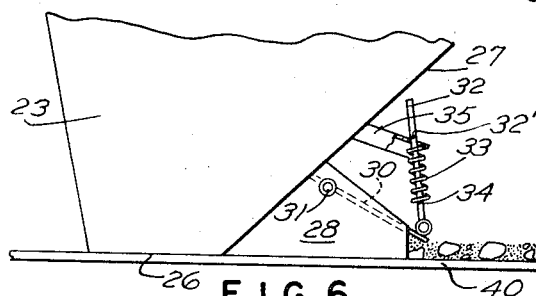
Figure 7:
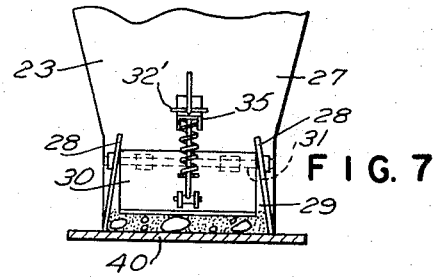
Figure 8:
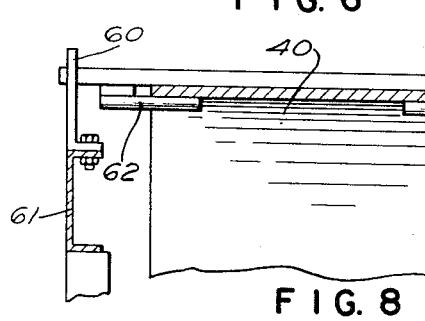
Figure 9:
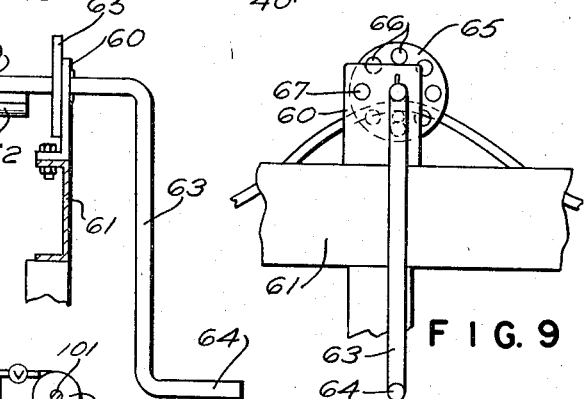
Figure 10:
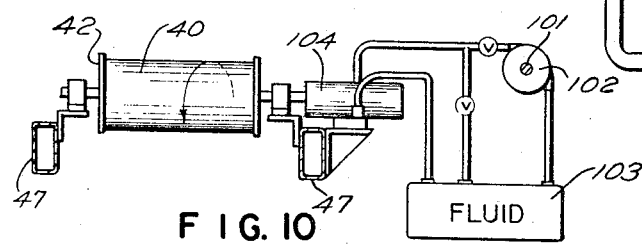

In the accompanying drawings:
FIGURE 1 is a perspective view of the entire apparatus;
FIG. 2 is an elevation of a part of the conveyor of the apparatus for directing the work to the separating screen;
FIG. 3 is a top plan view of the collapsible sections of the frame which mounts the pulleys about which the conveyor belt extends;
FIG. 4 is a side elevation of a fragmental portion of this frame showing the means for extending the sections;
FIG. 5 is a view similar to FIG. 4 showing the sections extended;
FIG. 6 is a fragmental elevation of the lower part of the hopper illustrating the resiliently mounted closure door;
FIG. 7 is an end view of the part shown in FIG. 6;
FIG. 8 is a sectional view of a detail for handling the belt when the frame upon which it is mounted is collapsed;

FIG. 9 is an end view of a fragmental portion of the frame and the part shown in FIG. 8; and FIG. 10 is a schematic view of the fluid power means.

With reference to FIG. 1 and of the drawings, an axle 10 is provided with wheels 11 at either end, and upon this axle there is mounted a frame 12 in such a manner that the frame may be moved up and down relative to the axle. The mounting comprises telescoping members designated generally 13 and 14, the tube 14 being fixed to the frame 12 and supported by struts 15, while the rod 13 is fixed to the axle 10 and is slidable through the tube 14. A fluid motor 16 which may be served by compressed air has its cylinder 17 fixed to the axle 10 with its plunger 18 fixed to the tube 14 between ears 19 projecting therefrom so that when fluid is utilized for forcing the plunger 18 upwardly out of its cylinder 17, the frame will be raised. This frame 12 also is provided with a leg 20 at one end having a pocket 21 which may receive some weighting means. A hopper 23 is mounted upon this frame 12 utilizing the leg 20 as a support therefor and also is supported with a stanchion 24 and a diagonal brace 25. This hopper, as will be seen in larger scale in FIGS. 6 and 7, has sides and end walls terminating in an opening 26 closely adjacent to the belt which will be described.

The wall 27 of this hopper which is the end wall of the hopper on the leading end thereof toward the advancing end of the belt is provided with an enlarged area formed by side walls 28 and an opening between these side walls at 29 for providing an enlarged mouth of the hopper. A door or gate 30 is pivoted as at 31 in the side walls 28 and is adjusted to control the height of material on the belt by a plunger 32 pinned as at 32', the pin resting upon bracket 35. A spring 33 engages a stop 34 on the plunger and the bracket 35 which extends from the wall 27 of the hopper. Should an enlarged chunk or piece of material get into the mouth of the hopper and be engaged by the belt and tend to move the chunk out of the hopper, the door 30 will move upwardly to permit this chunk to pass rather than to cause an injury to the belt.

The belt 40 is mounted in the frame 12 and extends closely adjacent the mouth of the hopper. This belt 40 extends about a pulley 41 at one end of a frame and a pulley 42 at the other or leading end of the frame. The frame comprises two sections. The first or inner section 45 mounts the pulley 41 and comprises a pair of tubular rods as can best be seen in FIG. 3 held in spaced relation by angle irons or rods 46 extending between them at spaced points. The second section which mounts the pulley 42 comprises a pair of tubular rods 47 which slidably engage the outer surface of the rods 45 of the first section and are guided by straps 48 and 49 affixed to the section 45. These rods 47 are also held together by cross members 51. The two sections of the frame may be mechanically moved to extended position by a fluid motor 52 comprising a cylinder 53 and a plunger or ram 54 extending therefrom. The cylinder of this fluid motor is pivoted as at 55 to one of the cross members 46 of the inner frame, while the ram is pivoted to an I beam 50 having pockets 56 formed by angle irons at its outer ends which may engage the ends 57 of the outer frame rods 47 when partly pulled out so as to slide the outer section outwardly with reference to the first or inner frame rods 45. In order to collapse the frame, it is merely necessary to cut off the fluid pressure and permit the motor 52 to exhaust its fluid pressure, a small mechanical force being applied to the end section.

As the frame collapses, the belt 40 will be slack, and this slack will be taken up on a reel which is formed by means of a rod 59 mounted in bearings 60 extending upwardly from the frame 12 (see FIG. 8) and supported by stringer 61. This rod 59 is equipped with inwardly extending fingers 62 spaced from the rod sufficiently so that the belt 40 may be tucked into these fingers as seen in FIG. 8. The rod is also equipped with a crank 63 and handle 64 which may then be rotated, and when the slack in the belt is taken up, a disk 65 (see also FIG. 9) having openings 66 therein will be held in position by a pin which may be passed through opening 67 in the bracket 60 so as to hold the reel belt in belt take-up position.

Upon the top of the hopper 23 there is mounted a grizzly 70 which comprises a rectangular frame 71 upon which a series of bars 72 are fixed. This grizzly is hingedly mounted along one end of the hopper as at 73 so that it may be swung about this hinge to incline it from the horizontal position shown in FIG. 1 to the inclined position shown in FIG. 2. A motor device 74 comprises a cylinder 75 and a ram 76 hinged upon the frame 12 as at 77 and hinged to the grizzly as at 78 so that when power is applied at tube 79, the grizzly may be moved to the inclined position as referred to above.

In the operation of the apparatus so far described, a load of gravel may be dumped upon the grizzly 70, and most of it will pass through the bars 72. Some big chunks of rock or the like may be retained on the grizzly. The material in the hopper is then funneled onto the conveyor belt 40 which will be elevated in the position to a desired height substantially as shown in FIG. 1, and this material will be dumped over the end of the conveyor into a screening separator. In FIG. 1, the material is shown as being fed to a trough 80 which has a screen bottom of a mesh such that fine sand-like particles will pass through the screen, while larger gravel particles will not pass through the screen but by reason of the inclination of the bottom surface of the screen will be discharged by means of the trough 81 into the pile 82 or in a truck. The sand-like particles which do pass through the screen will be deposited on the conveyor belt 85 supported in framework 86 and be discharged into the pile 87 or into a truck which may be beneath the end of this conveyor. The screen is agitated by an eccentric 90 with a suitable motor source mounted in the framework 91 which is pivoted on the truck or tractor 92 supported by wheels 93.

In order to power this apparatus, a motor 100 is mounted upon the axle 10 (note FIG. 2). This power is shown schematically in FIG. 10 where motor shaft 101 drives a fluid pump 102 to compress fluid in tank 103 which may then drive a fluid motor 104 at the outer end of the conveyor frame which, in turn, drives pulley 42 and belt 40. Also fluid from the compressed tank 103 may be utilized for fluid motors heretofore mentioned, 16 and 74. Likewise, fluid might be utilized for driving a motor to drive eccentric 90 for vibrating the screen 80.

I claim:

1. In a portable gravel handling apparatus, a conveyor comprising a frame having two relatively slidable sections for extension and contraction, pulleys at the end portions of the frame, an endless belt trained about said pulleys, fluid power means to extend said sections and tighten said belt and a reel carried by one of said sections having an arm for engaging the belt in slack condition due to contraction of said sections but still in endless embracing relation with said pulleys, said reel being rotatable to take up the slack in the belt.

2. In an apparatus as in claim 1 wherein there is an axle with wheels at the ends thereof, power means having two telescoping parts one of which is attached to the axle and the other of which is attached to the frame, a leg at one end of the frame for engaging the wheel supporting surface and fluid means for expanding the telescoping parts to lift the frame with reference to said axle initially inclining the frame to engage the leg with the supporting surface and then further inclining the frame with the leg acting as a fulcrum.

3. In a portable gravel handling apparatus, a conveyor comprising a frame having two relatively slidable sections for extension and contraction, pulleys at the end portions of the frame, an endless belt trained about said pulleys, fluid power means to extend said sections and tighten said belt, said power means comprising a fluid cylinder, having a piston therein and a ram extending therefrom, one of said sections having an abutment, a pivot mounting said cylinder on the other of said sections for swinging the end portion of said ram to and from the path of movement of said abutment in the sliding of said sections for engagement of said abutment for exertion of fluid power to extend said sections and removable from said path of movement by swinging the cylinder for contraction of said sections of the frame.

References Cited

UNITED STATES PATENTS

| | | | |
|---|---|---|---|
| 608,651 | 8/1898 | Cliff | 248—86.1 |
| 1,855,257 | 4/1932 | Phillips | 198—233 |
| 2,205,013 | 6/1940 | Joy | 198—139 |
| 2,251,667 | 8/1941 | Ehinger | 198—233 |
| 2,588,283 | 3/1952 | Osgood | 198—139 |
| 2,762,492 | 9/1956 | Hopkins | 198—139 |
| 2,846,051 | 8/1958 | Croggs et al. | 198—139 |
| 2,933,177 | 4/1960 | Long | 198—193 |
| 2,933,262 | 4/1960 | Fish | 242—86.1 |

EVON C. BLUNK, *Primary Examiner.*

M. L. AJEMAN, *Assistant Examiner.*